(12) United States Patent
Yu et al.

(10) Patent No.: US 7,081,933 B2
(45) Date of Patent: Jul. 25, 2006

(54) LIGHT GUIDE PLATE WITH EMBOSSMENTS AND BACKLIGHT SYSTEM USING THE SAME

(75) Inventors: Tai-Cheng Yu, Tu-chen (TW); Charles Leu, Fremont, CA (US); Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 53 days.

(21) Appl. No.: 10/749,338

(22) Filed: Dec. 31, 2003

(65) Prior Publication Data
US 2004/0155995 A1  Aug. 12, 2004

(30) Foreign Application Priority Data
Dec. 31, 2002  (TW)  ................. 91137946 A

(51) Int. Cl.
*G02F 1/1335*  (2006.01)
*F21V 7/04*  (2006.01)

(52) U.S. Cl. .................. 349/62; 349/64; 349/65; 362/606; 362/607; 362/619; 362/625

(58) Field of Classification Search .......... 349/62–65; 362/31, 606, 617–620, 615, 623–626, 607
See application file for complete search history.

(56) References Cited

U.S. PATENT DOCUMENTS

| | | | | |
|---|---|---|---|---|
| 5,317,430 | A * | 5/1994 | Uratani | 349/65 |
| 5,600,462 | A * | 2/1997 | Suzuki et al. | 349/112 |
| 5,926,033 | A * | 7/1999 | Saigo et al. | 326/31 |
| 6,474,827 | B1 * | 11/2002 | Shinohara et al. | 362/607 |
| 6,767,105 | B1 * | 7/2004 | Nakahashi et al. | 362/27 |
| 2002/0036729 | A1 * | 3/2002 | Ohkawa | 349/65 |
| 2002/0181224 | A1 * | 12/2002 | Tahara et al. | 362/31 |
| 2004/0114347 | A1 * | 6/2004 | Leu et al. | 362/31 |

FOREIGN PATENT DOCUMENTS

TW  486101  5/2002

* cited by examiner

*Primary Examiner*—Andrew Schechter
(74) *Attorney, Agent, or Firm*—Wei Te Chung

(57) ABSTRACT

The present invention provides a light guide plate (500) including a transparent plate (220) having an emitting surface (524) with a plurality of hemispherical embossments (540) formed thereon continuously side-by-side in rows and columns. The transparent plate also has a bottom surface (226) opposite to the emitting surface, with a plurality of hemispherical embossments (260) formed on the bottom surface. The embossments of the emitting and bottom surfaces all face in a direction away from the transparent plate. Other embodiments are also provided.

14 Claims, 4 Drawing Sheets

LIGHT GUIDE PLATE WITH EMBOSSMENTS AND BACKLIGHT SYSTEM USING THE SAME

BACKGROUND OF THE INVENTION

1. Field of the Invention

The present invention relates to a backlight system, and more particularly, to a backlight system having a light guide plate configured for diffusing light beams.

2. Description of the Prior Art

A liquid crystal display is capable of displaying a clear and sharp image through millions of pixels of image elements. It has thus been applied to various equipment in which a message or picture needs to be displayed, such as mobile phones and notebook computers. However, liquid crystal in the liquid crystal display does not itself emit light. Instead, the liquid crystal has to be lit up by a light source so as to clearly and sharply display text, pictures and images.

A conventional backlight system generally comprises a plurality of elements, such as a light source, a reflective plate, a light guide plate, a diffusion plate, and a prism layer. Among these elements, it is generally believed that the light guide plate is the crucial element that plays a vital role in determining the performance of the backlight system. The light guide plate serves as an instrument for receiving light beams from the light source, and for evenly distributing the light beams over the entire light guide plate through reflection and diffusion. In order to keep light evenly distributed over an entire surface of an associated liquid crystal display, the diffusion plate is arranged at a side of the light guide plate.

Taiwan Patent Publication No. 486101 issued on May 1, 2002 discloses a backlight system, which is represented in FIG. 8. The backlight system 100 generally comprises a prism layer 130, a diffusion plate 120, a light guide plate 110, and a linear light source 140. The linear light source 140 is arranged at a side of the light guide plate 110. The prism layer 130 comprises first and second prism plates 131, 133. Light beams from the light source 140 are directed to emit from a surface of the diffusion plate 120 via the light guide plate 110. The emitted light beams eventually penetrate the prism layer 130.

The light guide plate 110 further includes a reflective layer 150 disposed thereon by means of sputtering.

The backlight system 100 is provided with the diffusion plate 120 so that the light beams are evenly distributed and can provide uniform luminance. However, the diffusion plate 120 is an extra element that adds to costs of raw materials and costs of manufacturing. In addition, when the light beams travel from the light guide plate 110 and from the diffusion plate 120, they must cross two interfaces. Each interface has two media with different reflective indices. Portions of the light beams are reflected and absorbed, and the luminance of the backlight system 100 is reduced accordingly. As a result, optical performance of the backlight system 100 is diminished.

SUMMARY OF THE INVENTION

It is therefore an objective of the present invention to provide a light guide plate which can be manufactured at low cost and which reduces optical loss in a backlight system.

In order to achieve the above objectives, a light guide plate in accordance with the present invention generally includes a transparent plate with a plurality of hemispherical embossments formed thereon continuously side-by-side in rows and columns. The transparent plate includes a light emitting surface and a bottom surface opposite to the emitting surface. The embossments face in a direction away from the transparent plate.

The curvatures of the embossments formed on the light guide plate are capable of diffusing light beams introduced from a certain range of incident angles such that the light guide plate is provided with preferred diffusion performance. This obviates the need for an additional diffusion plate as generally seen in prior art backlight system. Consequently, manufacturing costs are reduced. In addition, since the optical embossments of the light guide plate are integrally formed with the light guide plate with identical material, there is no interface between the optical embossments and the light guide plate. The optical embossments do not cause loss of light energy.

According to another aspect of the present invention, a backlight system is provided with a light guide plate having improved optical performance. The light guide plate is configured with a plurality of hemispherical embossments creating enhanced light diffusion over an entire surface thereof, as described above. The backlight system is provided with a light source arranged at a side of the light guide plate so as to illuminate the light guide plate.

Other objects, advantages, and novel features of the present invention will become more apparent from the following detailed description when taken in conjunction with the accompanying drawings, in which:

DETAILED DESCRIPTION OF THE INVENTION

Figure 1:
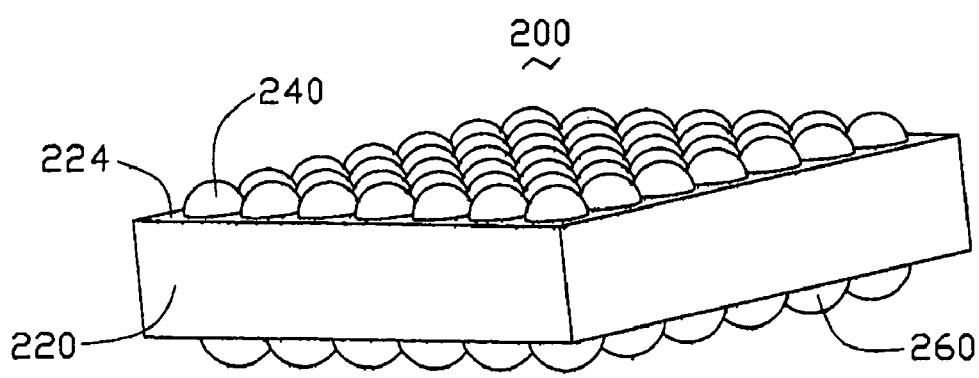
FIG. 1 is an isometric view of a light guide plate in accordance with the present invention.
Figure 2:
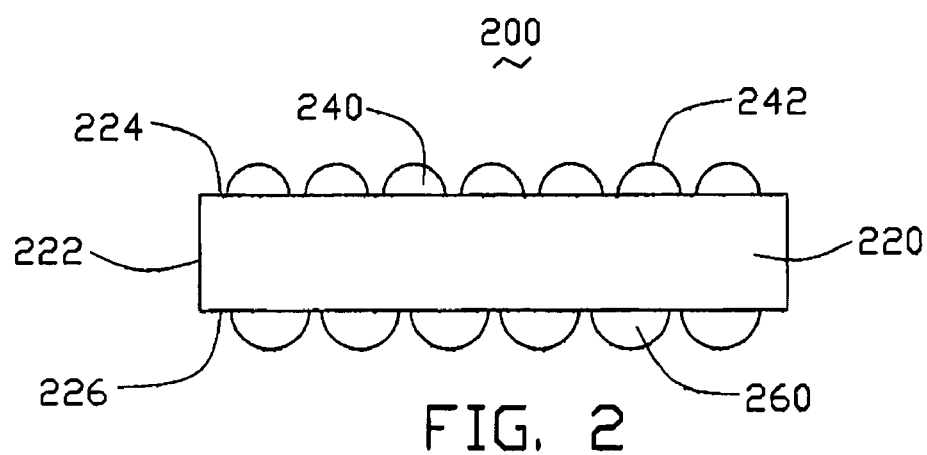
FIG. 2 is a side elevation of FIG. 1.
Figure 3:
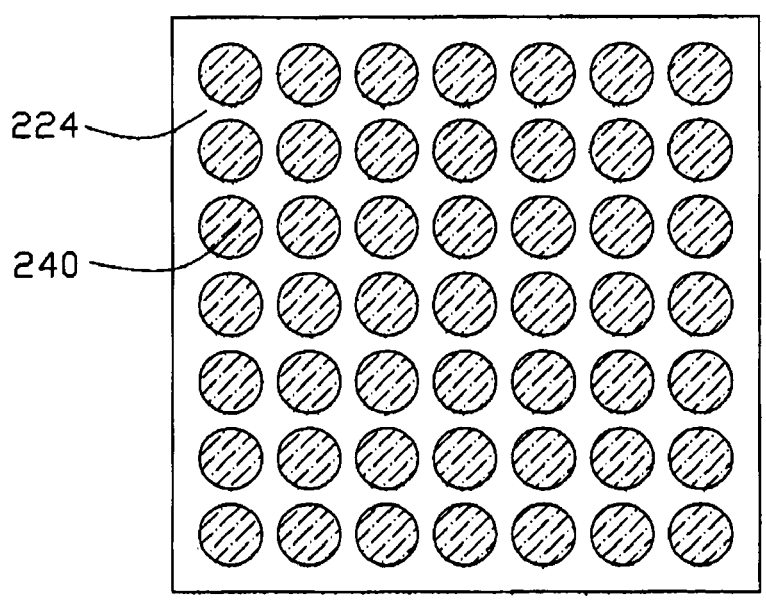
FIG. 3 is a top elevation of FIG. 1, showing a distribution of optical embossments of the light guide plate.

Referring to FIGS. 1, 2 and 3, a light guide plate 200 in accordance with a preferred embodiment of the present invention includes a transparent plate 220 on which a plurality of identical optical embossments 240 are formed. The transparent plate 220 is generally a flat panel made from polymethyl methacrylate (PMMA). The transparent plate 220 includes an incident surface 222, an emitting surface 224, and a bottom surface 226. The incident surface 222 faces a light source (not shown in the figures), and receives light beams from the light source. The introduced light beams from the incident surface 222 are then directed to and emitted from the emitting surface 224. The incident surface 222 is perpendicular to the bottom surface 226, while the emitting surface 224 is opposite to the bottom surface 226.

Figure 7:
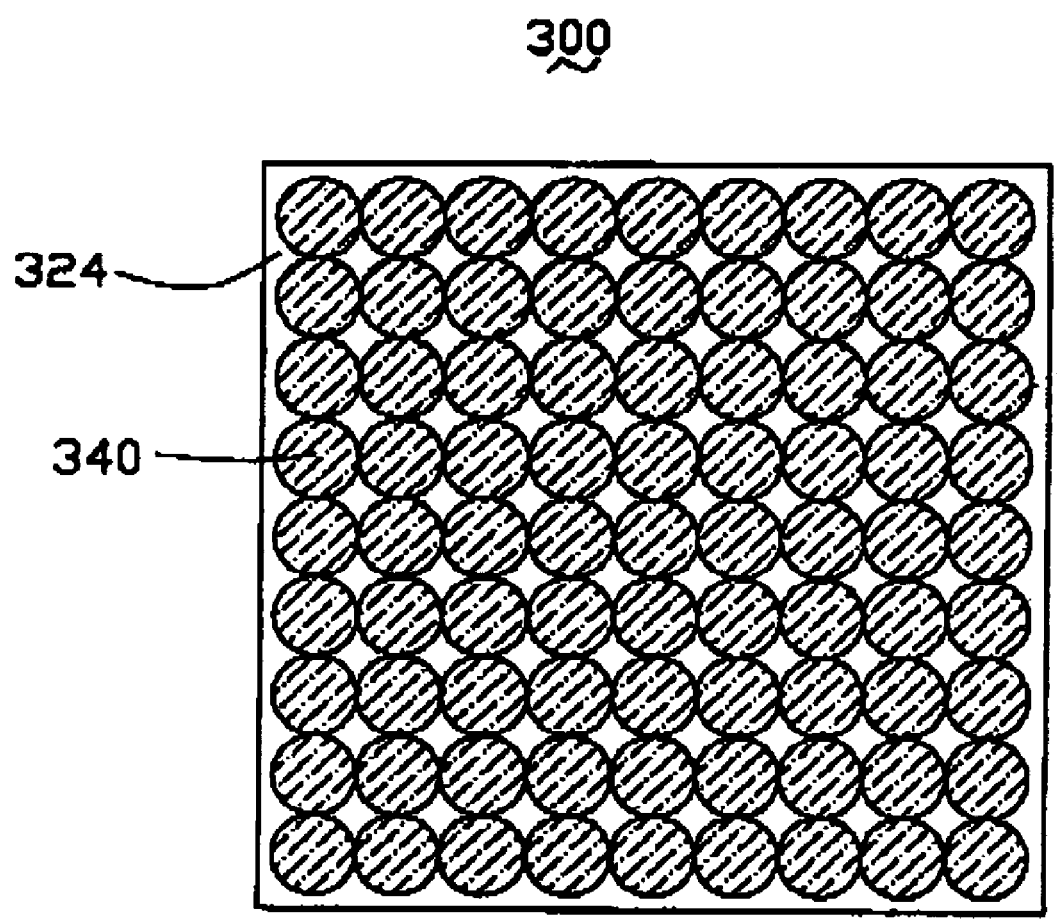
FIG. 7 is a top elevation of a light guide plate according to an alternative embodiment of the present invention, showing a distribution of optical embossments on an emitting surface of the light guide plate.
Figure 8:
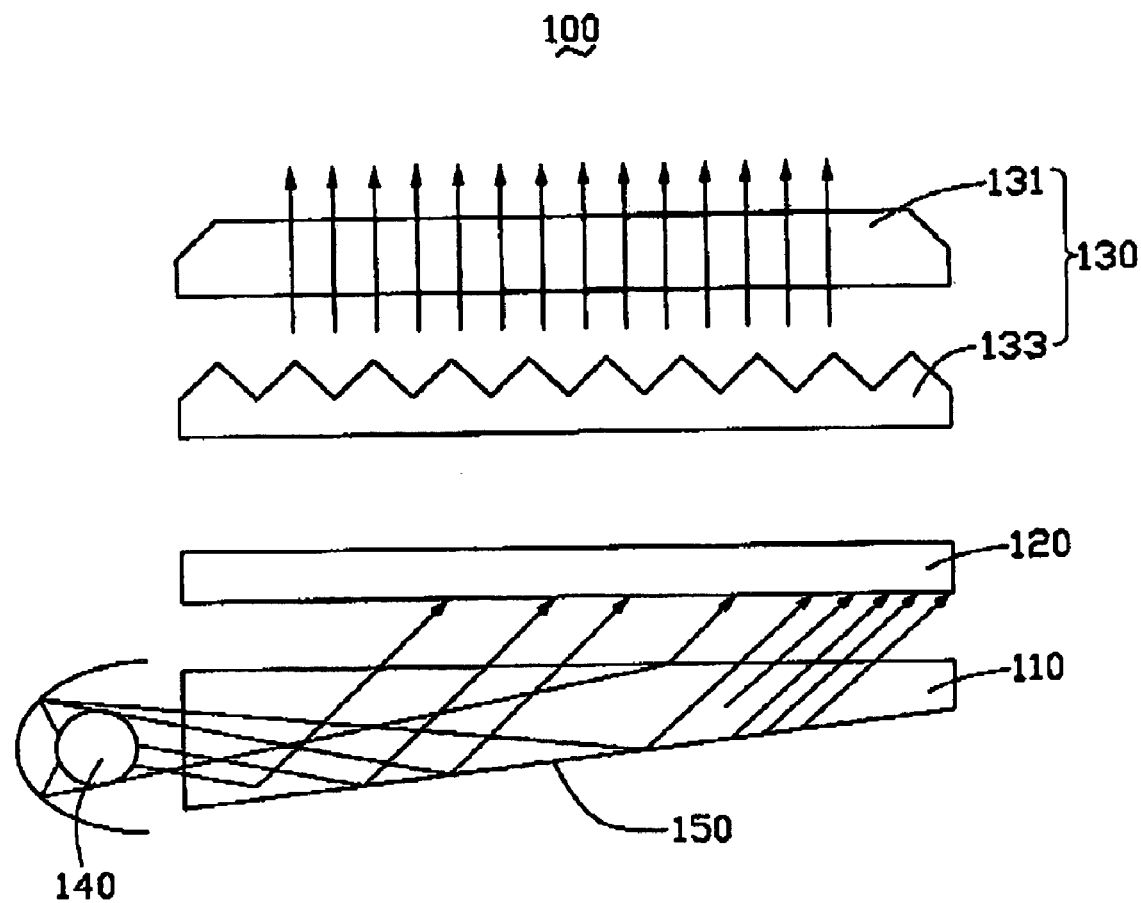
FIG. 8 is an exploded, side elevation of a conventional backlight system.

The embossments 240 are evenly distributed on the emitting surface 224, and are integrally formed with the transparent plate 220. The embossments 240 are generally hemispherical or partially hemispherical, and face outwardly away from the emitting surface 224. That is, a curvature of each embossment 240 is equal to or less than 180 degrees. In the preferred embodiment, the embossments 240 are arranged a distance away from each other. In an alternative embodiment, embossments 540 of a light guide plate 500 may be arranged on an emitting surface 524 continuously side-by-side in rows and columns, as shown in FIG. 7. In the preferred embodiment, each embossment 240 includes a curved surface 242, which diffuses most light beams coming from the incident surface 222. In addition, the embossment 240 diffuses light beams diffused or reflected from the bottom surface 226. As a result, the light beams introduced into the transparent plate 220 are evenly emitted from the emitting surface 224.

Figure 4:
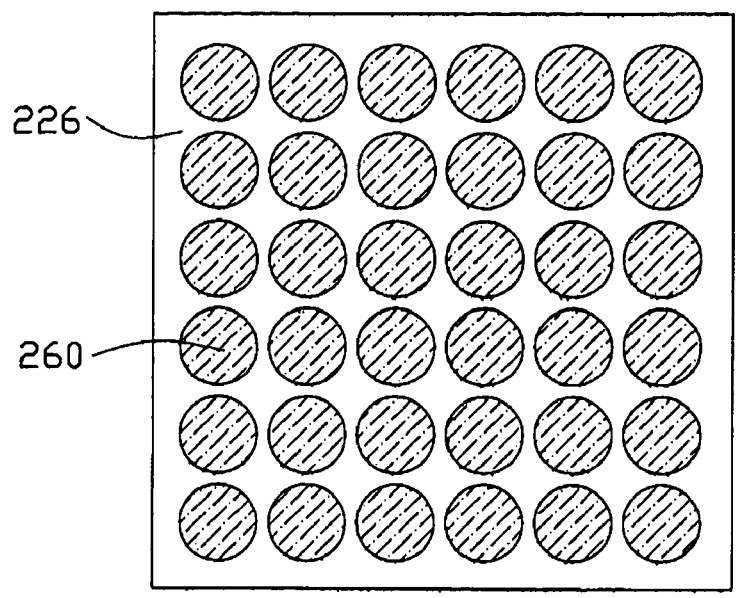
FIG. 4 is a bottom elevation of FIG. 1, showing a distribution of dots of the light guide plate.

Referring to FIGS. 2 and 4, the bottom surface 226 is provided with a plurality of identical dots 260. The dots 260 diffuse light beams coming from the incident surface 222 of the transparent plate 220, so that the light beams are evenly emitted from the emitting surface 224.

The dots 260 are generally hemispherical or partially hemispherical, and are evenly distributed on the bottom surface 260 of the transparent plate 220. The dots 260 help defuse complete reflection of the light beams within the transparent plate 220. That is, incident light beams traveling to the dots 260 are diverted so that they emit from the emitting surface 224 of the transparent plate 220 instead of being reflected therefrom. The dots 260 are generally hemispherical, and face outwardly away from the bottom surface 226. In the preferred embodiments, a radius of each dot 260 is larger than a radius of each embossment 240.

Figure 5:
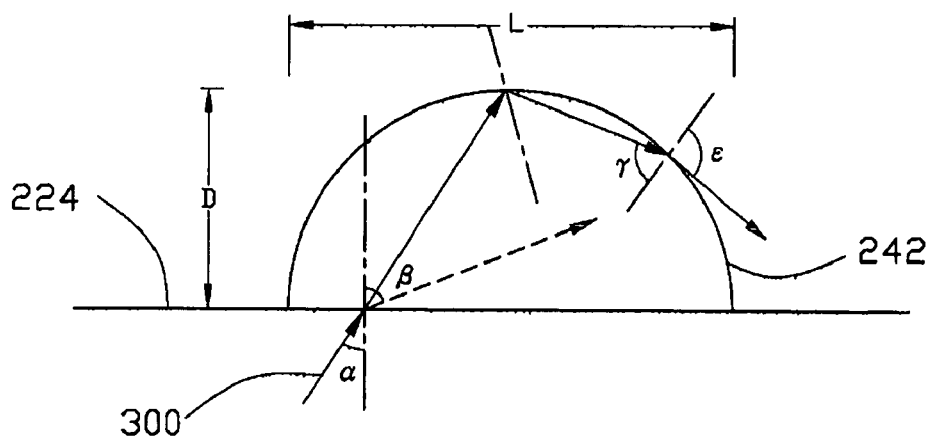
FIG. 5 is a light path diagram of a single optical embossment of the light guide plate of FIG. 1.

Referring to FIG. 5, a light path within one embossment 240 is shown. If there were no embossment 240, a light beam 300 diffused and reflected from the bottom surface 226 would emit from the emitting surface 224 at an angle $\beta$, assuming that an incident angle $\alpha$ of the light beams 300 is less than a complete reflection angle. However, by the provision of the embossment 240 on the omitting surface 224, the light beam 300 is first completely reflected at the curved surface 242, and then is incident into the curved surface 242 at an angle $\gamma$. If the angle $\gamma$ is smaller than the complete reflection angle, then the light beam 300 is emitted from the curved surface 242 at an angle $\epsilon$. The light beam 300 travels from a medium of high refractive index, in which the refractive index is larger than 1, into the medium of air which has a relatively low refractive index of 1. The reflective formula is $n = \sin i / \sin \omega$.

wherein
n is the refractive index of the high reflective media, which is larger than 1;
i is the emitting angle; and
$\omega$ is the incident angle.

As can be understood from FIG. 5, in comparing the angles of the light beam 300 emitting from the curved surface 242 and the emitting surface 224, it is apparent that unlike the emitting surface 224 of the transparent plate 220, the curved surface 242 of the embossment 240 diffuses the light beam 300 having the incident angle $\alpha$ covering a certain range. The incident angle $\alpha$ is determined by the refractive index of the PMMA and the curvature of the curved surface 242. Further, for a given diameter L, when the curvature of the curved surface 242 increases, the overall height D of the embossment 240 increases correspondingly. The angle $\epsilon$ increases correspondingly, and the diffusion effect is even more pronounced.

It will be appreciated that the light guide plate 200 can have other forms. For example, the light guide plate 200 can be trapezoidal or can be provided with two incident surfaces 222. In other examples, the dots 260 can be dome-shaped, frustum-shaped, or cylindrical. Alternatively, the dots 260 can be hollow regions. Such hollow regions can be hemispherical, partially hemispherical, concave, frustum-shaped, or cylindrical.

Figure 6:
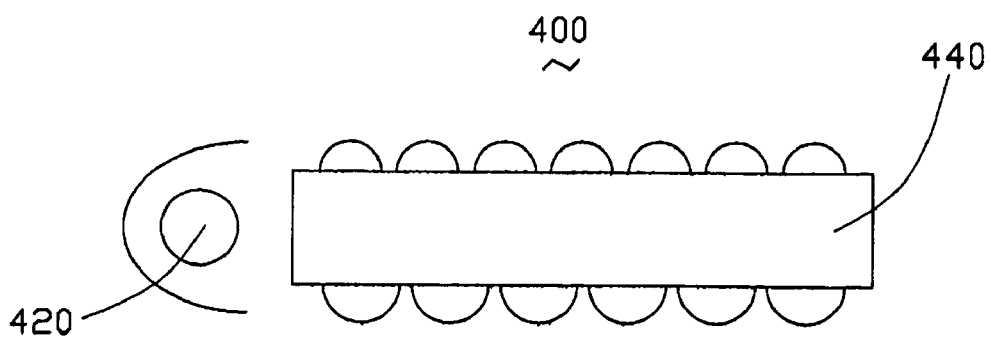
FIG. 6 is a side elevation of a backlight system incorporating the light guide plate in accordance with the present invention.

Referring to FIG. 6, a backlight system 400 in accordance with the present invention includes a light source 420 and a light guide plate 440. The light source 420 is arranged at a side of the light guide plate 400. The light guide plate 440 is configured according to any of the embodiments described above.

The backlight system 400 is not limited to the embodiment shown in FIG. 7. For example, the backlight system 400 can be provided with two light sources 420 arranged at opposite sides of the light guide plate 440 respectively.

It is to be further understood that even though numerous characteristics and advantages of the present invention have been set out in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:
1. A light guide plate, comprising:
a transparent plate having a light emitting surface, and a bottom surface opposite to the light emitting surface; and
a plurality of optical embossments arranged across on the light emitting surface continuously side-by-side in rows and columns,
wherein each of the optical embossments is substantially hemispherical or partially hemispherical.
2. The light guide plate as recited in claim 1, wherein the transparent plate is substantially a flat panel or is trapezoidal.
3. The light guide plate as recited in claim 1, wherein transparent plate is made from polymethyl methacrylate (PMMA).
4. The light guide plate as recited in claim 1, wherein the optical embossments are made from polymethyl methacrylate (PMMA).
5. The light guide plate as recited in claim 1, wherein the optical embossments are integrally formed with the light guide plate.
6. The light guide plate as recited in claim 1, wherein the optical embossments having uniform dimensions, and are evenly distributed on the emitting surface of the transparent plate.
7. A light guide plate, comprising:
a transparent plate having a light emitting surface, and a bottom surface opposite to the light emitting surface; and
a plurality of optical embossments arranged on the light emitting surface continuously side-by-side in rows and columns,
wherein the transparent plate further has a plurality of dots evenly distributed on the bottom surface.
8. The light guide plate as recited in claim 7, wherein the dots have uniform dimensions.

9. The light guide plate as recited in claim 8, wherein the dots are generally hemispherical, partially hemispherical, dome-shaped, frustum-shaped, or cylindrical.

10. The light guide plate as recited in claim 8, wherein the dots are hollow regions that are hemispherical, partially hemispherical, concave, frustum-shaped, or cylindrical.

11. The light guide plate as recited in claim 7, wherein a diameter of each of the dots is larger than a corresponding diameter or width of each of the optical embossments.

12. A backlight system, comprising:
   a light guide plate including a transparent plate having a light emitting surface, a bottom surface opposite to the light emitting surface, and a plurality of optical embossments the evenly distributed on the light emitting surface of the light guide plate continuously side-by-side in rows and columns; and
   a light source arranged at a side of the light guide plate, wherein said embossments are further applied upon the bottom surface.

13. A light guide plate, comprising:
   a transparent plate having a light emitting surface, a bottom surface opposite to the light emitting surface, and a plurality of dots evenly distributed on the bottom surface, the dots having uniform dimensions and being generally hemispherical, partially hemispherical, dome-shaped, frustum-shaped, or cylindrical; and
   a plurality of optical embossments arranged on the light emitting surface.

14. A light guide plate, comprising:
   a transparent plate having a light emitting surface, a bottom surface opposite to the light emitting surface, and a plurality of dots evenly distributed on the bottom surface, the dots having uniform dimensions and being hollow regions that are hemispherical, partially hemispherical, concave, frustum-shaped, or cylindrical; and
   a plurality of optical embossments arranged on the light emitting surface.

* * * * *